United States Patent Office 3,537,821
Patented Nov. 3, 1970

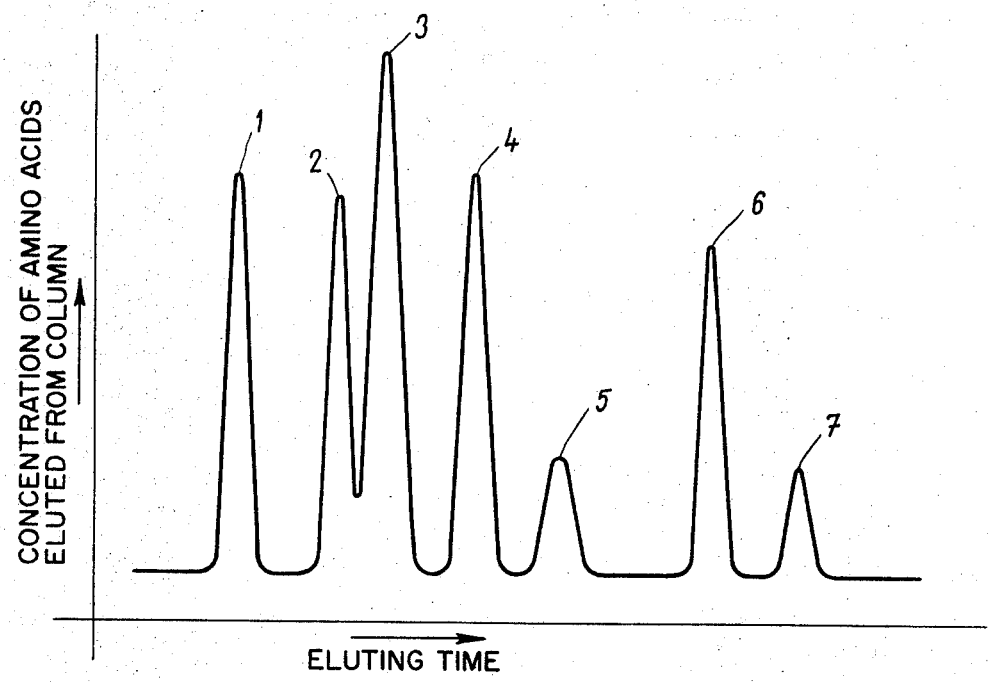

3,537,821
METHOD OF EXAMINING MIXTURES OF AMINO ACIDS BY CHROMATOGRAPHY
Jiri Hrdina, Prague, Czechoslovakia, assignor to Ceskoslovenska akademie ved, Prague, Czechoslovakia
Filed Apr. 15, 1968, Ser. No. 721,497
Claims priority, application Czechoslovakia, Apr. 25, 1967, 3,002/67
Int. Cl. G01n 31/04
U.S. Cl. 23—230                                                    8 Claims

ABSTRACT OF THE DISCLOSURE

A method of examining pairs of amino acids that are difficult to separate from each other in a chromatographic column, and of evaluating them in the resulting chromatogram. The chromatographic colum is fed with an eluent which has been enriched with an adduct of organic solvents having an aliphatic chain therein and which has a boiling point higher than 100° centigrade. The eluent is supplied to the chromatographic column within a period which is either equal to or shorter than the elution time of one constituent of the particular amino acid pair being examined, and the start of the eluent-supplying period precedes the introuction of the specimen to be chromatographically evaluated or separated.

BACKGROUND OF THE INVENTION

Field of the invention

The present invention relates to the chromatographic examination of amino acid mixtures, and more particularly to the chromatographic separation of a threonine-serine amino acid pair from each other as shown in a resulting chromatogram.

Summary of the prior art

Heretofore the separation of individual amino acid mixtures has been carried out in well-known column elution chromatographic processes using polystyrene cation exchangers, the elution taking place by means of a plurality of buffer solutions having step-wise pH-values, or of a buffer solution having a continuously increasing pH-value or a continuously increasing ionic strength.

In the past, many types of chomatographic systems have been suggested and actually adopted in practice. For example, particular components of amino acid mixtures have been separated from one another either on a single column or by using two or three columns. A common aim followed by all of these systems is that all of the amino acids should be discerned or detected in the resulting chromatogram as perfectly as possible. On the basis of the elementary laws of chromatography, it is possible to promote this aim or objective by increasing the column lengths, or on the other hand, by extending the period of the chromatographic process.

Contrary to these theoretical teachings, however, it is sometimes desired in practice to finish or complete the chromatographic process as quickly as possible. To this end, the perfection of the chromatographic separation is in most cases deliberately given up, especially if the errors resulting from the reduction of the reaction time do not surpass those errors caused by other reasons, particularly those errors caused by the systems which evaluate the chromatograms.

It is already known that with some vicinal amino acids it is not difficult to attain sufficiently large distances in the resulting chromatograms. With other types of amino acids, however, especially with some critical amino acid pairs such as, for example, thyrosine-phenyl-alanine, glycine-alanine, and in particular threonine-serine of which mutual chromatographic distances are the smallest, some problems are encountered which cause a reduction of the rate of the desired chromatographic separation.

Among the factors influencing the positions of individual amino acids in the resulting chromatogram, there may be ranked composition, and particularly pH-values of the elution buffers in predetermined chromatogram sections, as well as operating temperature.

Recently it has become known that it is possible to improve the separation of the critical threonine-serine amino acid pair from each other by using an admixture of methanol, or some other alcohol having a short carbon chain. The difficulty of the separation of this critical amino acid pair constitutes, as a rule, the main limiting factor in endeavoring to get the desired quality in the chromatographic separating process.

The aforesaid method of separating the threonine-serine amino acid pair has actually been utilized in practice in well-known processes carried out on some industrially manufactured apparatus, but is connected with some serious disadvantages. One of these disadvantages consists in that simultaneously with the improved separation of the threonine-serine amino acid pair, there is also an undesirable change in positions of some other pairs taking place, such as with glycine-alanine which may then in turn become a critical pair. Another no less important drawback of methanol, or other alcohol with a short carbon chain, is the fact that they have boiling points so low that it is necessary to carry out the evaluating ninhydrine color-forming reaction at a temperature lower than the normally used temperature of 100° centigrade, for instance 95° centigrade, unless rather uncomfortable steps of considerable pressure elevation in the capillary reactor are taken. According to the orthodox or standard method, however, the ninhydrine color-forming reaction should proceed at a temperature of 100° centigrade for a period of 15 minutes.

The reduction of the reaction temperatures per se is substantially noxious or undesirable for the entire evaluating process, since it causes not only the reduction of reaction yield but also the promotion of sources of non-linear relationship, i.e., it renders or makes the concentration of the resulting measured dye indirectly proportional to the amino acid concentration, especially if fresh ninhydrine agent has not been used. Moreover, the temperature reduction is responsible for incomplete reactions, particularly in cases where the rate of reaction of the constituents with ninhydrine agent is slow. This is why the dependence of the reaction upon some secondary, more or less variable, factors is increased, such as, for example, electric current input frequency which, at least with conventional apparatus, determines the pump speed and consequently the reaction time.

For the aforesaid and other reasons it is advisable to use a reaction temperature of at least 100° centigrade as is usual with conventional processes employing no special manostatic means, or on the other hand, with manostatically controlled processes enabling superatmospheric pressures to be maintained in the reactor, temperatures over 100° centigrade may consequently be used to carry out the color-forming reaction. Therefore, it appears necessary or desirable to substitute for well-known methanol, or any other alcohol with a short carbon chain, as a means for improving the separation of the critical threonine-serine amino acid pair from each other, with another substance which would eliminate or at least mitigate the disadvantages as hereinbefore set forth.

The purpose of the present invention and the basic object of the same is to overcome the aforementioned disadvantages and to significantly improve the chromatographic examination of amino acid mixtures.

SUMMARY OF THE INVENTION

In accordance with one feature of the invention, a method of chromatographic examination of amino acids is provided, and more particularly a method of improving the separation of the amino acid pair of threonine-serine is provided. The method comprises feeding a chromatographic column with an eluent enriched with an admixture of organic solvents having an aliphatic chain and having a boiling point higher than 100° centigrade. More particularly, glycols and alkyl ethers thereof may be used whereby the separation of the amino acids threonine and serine is improved.

Another feature of the present invention consists in that the above mentioned eluent is supplied to the chromatographic column within a period which is equal to or shorter than the elution time of serine, the start of the eluent supplying period preceding the introduction or instant of carrying-in of the specimen or substance to be chromatographically separated.

BRIEF DESCRIPTION OF THE DRAWING

The drawing shows in accordance with the present invention a chromatogram involving a chromatographic process from the beginning up to the elution of alanine.

DESCRIPTION OF THE PREFERRED EMBODIMENT

In chromatographically examining amino acids on polystyrene cation exchangers, the substances according to the present invention may also bring along their specific advantages known per se. Thus, for instance, methylcellosolve (ethyleneglycol monomethylether) acts as a solvent for components of the evaluating agent or the colored products of the color-forming reaction, which components are hard to dissolve in any other solvent. As it is well-known, methylcellosolve has been used as an important solvent in the evaluating ninhydrine agent reaction, whereas in well-known processes of chromatographic amino acid examination it has not been added to the elution buffers.

Further, a small amount of thiodiglycol may be added to the elution buffer solutions, of which the antioxidizing power is known per se. In order to attain the effects according to the invention, it is necessary to use substantially higher concentrations, i.e., about 5 percent, relative to a negligible usual concentration, to get the desired antioxidizing effect of thiodiglycol.

The chromatographic method of separating amino acid mixtures on polystyrene cation exchangers according to the invention also indirectly enables a better separation of some other adjacent amino acid pairs, particularly thyrosine-phenylalanine, due to the fact that on such a cation exchanger a sufficiently great chromatographic difference occurs between these amino acids. As has been proved experimentally, cation exchangers possessing a fair separating power for thyrosine and phenylalanine are not as suitable for the separation of the threonine-serine pair, and in view of their selectivity it is not possible to use them for separating all amino acid types, especially not in modern, very effective processes. Nevertheless, this shortcoming can be compensated by using organic solvents according to the invention whereby the chromatographic distance between threonine and serine will be increased to such an extent that the respective cation exchangers can preferably be used for attaining a good separation of both threonine-serine and thyrosine-phenylalanine amino acid pairs.

Simultaneously, it is possible to attain a good separation of another relatively close pair, i.e., glycine-alanine, with even a fair separation of the pair isoleucine-leucine being observed.

The chromatographic separation of the amino acid pair of thyrosine-phenylalanine can moreover be improved beyond using the usual two buffers having pH-values 3.25 and 4.25, respectively. That is, there may be used for the elution of the last-mentioned pair of amino acids another buffer having a pH-value of about 4.25, or an increased normality relative to the two former. Preferably, the same buffer may be used which is used in the orthodox process of separating basic amino acids on a short column. The process of elution of the thyrosine-phenylalanine amino acid pair by means of the third buffer may be started in the instant in which the front part of the buffer has left the column in the elution of leucine and before the elution of thyrosine.

By combining the hereinbefore described effect with the use of the organic solvents according to the invention with the aim to improve the separation of the threonine-serine amino acid pair, it is possible to carry out a very effective chromatographic separation of all amino acid types even on such cation exchangers which by using any other method are insufficient to separate any of the aforesaid amino acid pairs.

The novel features which are considered as characteristics for the invention are set forth in particular in the appended claims. The invention itself, however, and its mode of operation, together with additional objects and advantages thereof, will be further understood from the following description of a specific mode of carrying the invention into practice when read in connection with the accompanying drawing.

EXAMPLE

A chromatographic acid column is regenerated with sodium hydroxide, and the regenerated chromatographic column is fed with a citrate buffer having a pH-value of 3.20 and a normality of 0.2, which buffer has been enriched with 6 percent of thioglycol. After the specimen to be examined has been carried in, the chromatographic reaction proceeds and is finished when aspartic acid is eluted, as shown by the curve peak 1 of the chromatogram illustrated in the drawing. Afterwards the reaction proceeds with the thiodiglycol-free buffer having a pH-value of 4.25 and a normality of 0.2 being used; in this part of the reaction, threonine (peak 2), serine (peak 3), glutamic acid (peak 4), proline (peak 5), glycine (peak 6), and alanine (peak 7) are successively eluted.

As may be seen from the chromatogram, and more particularly from the peaks 2 and 3, the separation of the threonine-serine amino acid pair is quite discernible as are the other amino acids.

While the invention has been illustrated and described as embodied in a method of a method of examining mixtures of amino acids by chromatography, it is not intended to be limited to the details shown, since various modifications may be made without departing in any way from the spirit of the present invention.

What is claimed as new and desired to be protected by Letters Patent is set forth in the appended claims:

1. A method for the chromatographic separation of amino acid mixtures and similar substances by means of column chromatography on cation exchangers, comprising the steps of:
    (a) introducing onto the column a first elution buffer enriched with an admixture belonging to the group of glycols and their alkyl ethers,
    (b) introducing onto the column a specimen of the substance to be chromatographically separated, and
    (c) introducing onto the column a second elution buffer free from said enriching admixture.

2. A method as claimed in claim 1 comprising the following further steps:
    (a) evaluating the chromatographically separated substances contained in the specimen, and
    (b) regenerating the column by means of a regeneration agent.

3. A method as claimed in claim 1, wherein the admixture added to said first elution buffer has a boiling point over 100° C.

4. A method as claimed in claim 1, wherein the supply of said enriched elution buffer does not start later than during the introduction of the sample to be chromatographically separated.

5. A method for the chromatographic separation of amino acid mixtures by means of column chromatography on cation exchangers, which method comprises:
   (a) introducing onto the column a first elution buffer enriched with an admixture belonging to the group of glycols and their alkyl ethers,
   (b) introducing onto the column a specimen of the amino acid mixture to be chromatographically separated, the amino acid mixture comprising at least the threonine-serine amino acid pair, the supply of the enriched buffer to the column starting not later than the introduction of the specimen onto the column and for a period not longer than the entire elution period of serine,
   (c) introducing onto the column a second elution buffer free from said enriching mixture, and
   (d) evaluating the chromatographically separated amino acids contained in the specimen.

6. The method of claim 5 wherein the column is a polystyrene cation exchanger which is regenerated by passing sodium hydroxide therethrough.

7. The method of claim 5 wherein the first elution buffer is a citrate buffer enriched with thiodiglycol and the second elution buffer is free from thiodiglycol.

8. The method of claim 5 wherein the first elution buffer is a citrate buffer enriched with ethyleneglycol monomethylether and the second elution buffer is free from ethyleneglycol monomethylether.

References Cited

Kesner et al.: "Automatic Column Chromatography of Ether and Water-Soluble 2,4-Dinitrophenyl-derivatives of Amino Acids, Peptides, and Amines," Analytical Chemistry, vol. 35, No. 1, January 1963, pp. 83–89.

MORRIS O. WOLK, Primary Examiner

R. E. SERWIN, Assistant Examiner

U.S. Cl. X.R.

210—31; 260—112,5